United States Patent [19]
Bishop

[11] Patent Number: 5,611,525
[45] Date of Patent: Mar. 18, 1997

[54] COMBINATION FENCE AND TABLE FOR POWER TOOL

[75] Inventor: Walter M. Bishop, McMinnville, Tenn.

[73] Assignee: DeVlieg-Bullard, Inc., Rockford, Ill.

[21] Appl. No.: 301,858

[22] Filed: Sep. 7, 1994

[51] Int. Cl.$^6$ ............................................. B23Q 3/00
[52] U.S. Cl. ........................... 269/303; 269/79; 269/315
[58] Field of Search ............................ 269/79, 99, 100, 269/101, 102, 303, 315; 83/467.1, 468, 468.5, 468.3, 473

[56] References Cited

U.S. PATENT DOCUMENTS

| | | | |
|---|---|---|---|
| 785,699 | 3/1905 | Bemis | 83/468 |
| 2,351,773 | 6/1944 | Lovenston | 269/79 |
| 2,365,436 | 12/1944 | Saucier | 269/79 |
| 2,401,054 | 5/1946 | Daley | 269/303 |
| 4,265,154 | 5/1981 | Batson | 83/468 |
| 4,884,604 | 12/1989 | Rice et al. | 269/315 |
| 5,372,536 | 12/1994 | Bialek | 269/79 |

*Primary Examiner*—Bruce M. Kisliuk
*Assistant Examiner*—Thomas W. Lynch
*Attorney, Agent, or Firm*—Jenner & Block

[57] ABSTRACT

A combination fence and table for use with a power tool provides means for rotating a plate from a table position to a fence position. The plate also is tiltable with respect to the base of the apparatus. The edge of the plate closest to the power tool remains at a substantially constant distance from the power tool throughout the range of angles that the plate is tilted. When used in the fence position, the plate is movable linearly across the width of the power tool.

11 Claims, 4 Drawing Sheets

COMBINATION FENCE AND TABLE FOR POWER TOOL

BACKGROUND OF THE INVENTION

1. Field of the Invention

The invention relates to power tools, and more particularly, to an apparatus capable of functioning as either a fence or a table when used with a power tool.

2. Description of Related Art

Existing power tools typically have separate fences and tables. A table generally is used to support a workpiece. For example, when a belt sander is in its upward, vertical position, the table is horizontal across the width of the sander so that a workpiece is placed on top of the table in order to be brought into contact with the sander. A fence, by contrast, is used to guide a workpiece when an operator slides the workpiece along the surface of the fence. For example, when a belt sander is in its horizontal position, the fence is vertical and placed parallel to the direction that the belt sander runs. In this position, a workpiece is slid along the fence and brought into contact with the sander. Existing power tools have two separate apparatuses to serve these two functions, i.e., one apparatus serves as a fence and a second apparatus serves as a table.

It is known in the art to have tables capable of tilting to form an angle with the horizontal plane. Conventionally, this tilt is accomplished by providing a hinge where the table is connected to the power tool. When an operator wants to tilt the table to a new angle, the table is loosened, tilted to the new angle and retightened by appropriate means. When the table is loosened, however, it is free to pivot about the hinge and can fall onto the power tool, thereby damaging the power tool and/or the table.

Another problem with existing apparatuses is that it is difficult to maintain an essentially constant, relatively short distance between the edge of the table or fence and the power tool when the table or fence is tilted to a new angle. While some existing power tools allow for the maintenance of this distance, this ability requires difficult manual adjustment.

Thus, it is desirable to provide a single apparatus that: (1) serves both as a fence and as a table for a power tool; (2) prevents the table from falling onto the power tool when the table is being tilted; and (3) maintains an essentially constant distance between the table and the power tool automatically when the table is tilted to a new angle.

OBJECTS AND SUMMARY OF THE INVENTION

Thus, it is an object of the present invention to provide for a single apparatus capable of being used both as a fence and as a table in conjunction with a power tool such as a belt sander or a jointer.

It is a second object of the present invention to allow the fence/table to be tilted without allowing the fence/table to fall onto the power tool.

It is an additional object of the present invention to maintain an essentially constant distance between the fence/table and the power tool when the fence/table is tilted through a range of angles.

These objects are accomplished in the present invention by an apparatus comprising a base and a plate, which in one position is substantially perpendicular to the base. The base is joined to the power tool and means are included for rotating the base through a range of positions bounded at one extreme by a table position and bounded at the other extreme by a fence position. A pair of placement bolts are used to join the base to the power tool. The base defines a pivot opening for housing one placement bolt and an arc track for housing the second placement bolt. The arc track spans about 90° and allows for rotation of the base with respect to the power tool so that the plate is selectively placed in either the table position, the fence position or any intermediate position desired. The base is movable linearly across the width of the power tool via one or more straight tracks.

According to another aspect of the present invention, the plate is tilted to an angle with respect to the base other than the substantially perpendicular position. This tilt is accomplished both in the table position and in the fence position by a long link and a short link having a channel therein housing a pin. The short link and the long link are connected to the base and to the plate. The apparatus maintains the edge of the plate closest to the power tool at an essentially constant distance from the power tool throughout this range of angles.

In a preferred embodiment, the plate accomplishes each of the above-referenced features. The plate is rotatable from a fence position through a series of intermediate positions to a table position and vice versa. The plate is tiltable with respect to the base and maintains an essentially constant distance between its edge closest to the power tool and the power tool itself.

DETAILED DESCRIPTION OF THE PREFERRED EMBODIMENT

Figure 1:
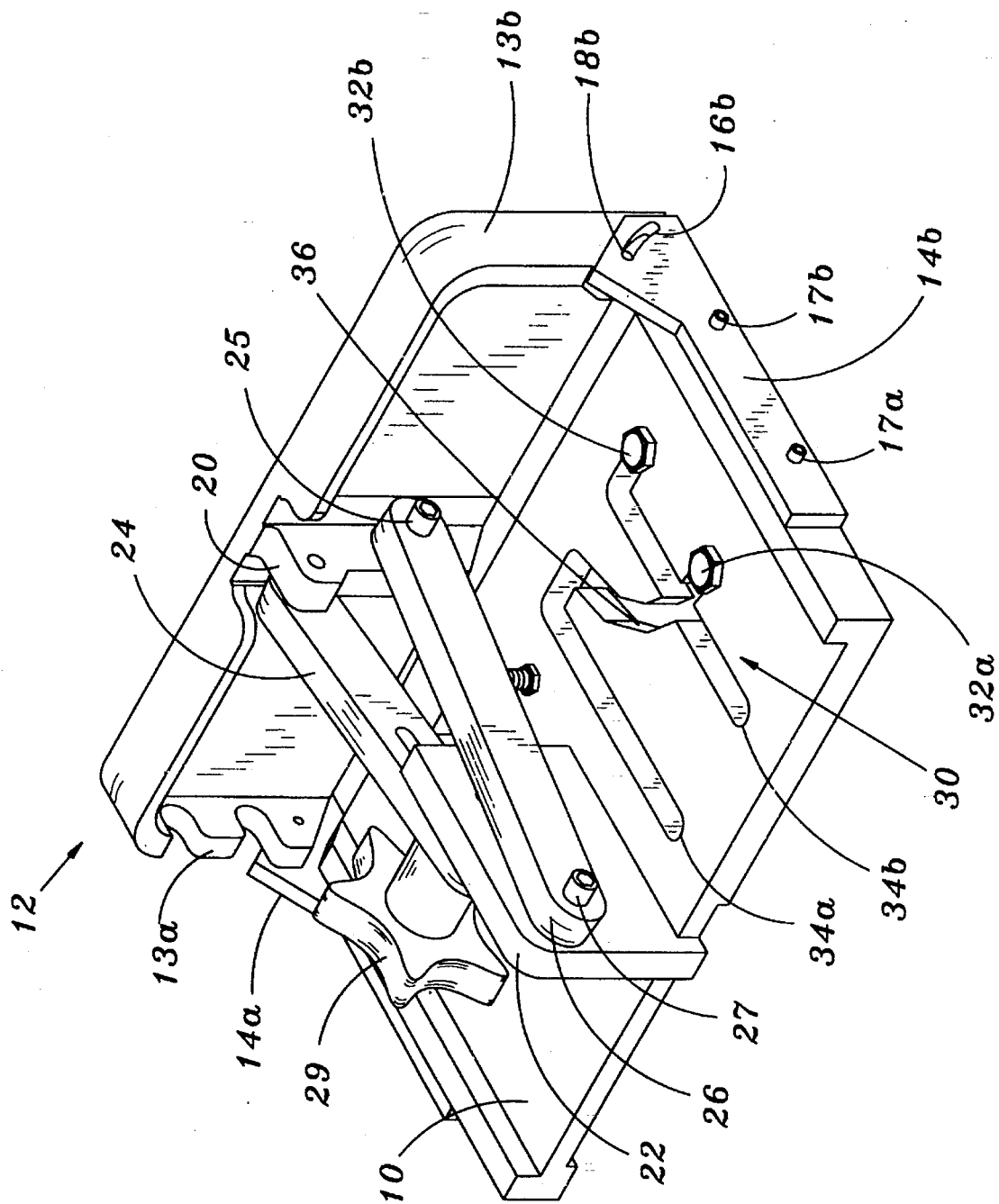
FIG. 1 is a perspective view of the fence/table of the present invention.
Figure 2:
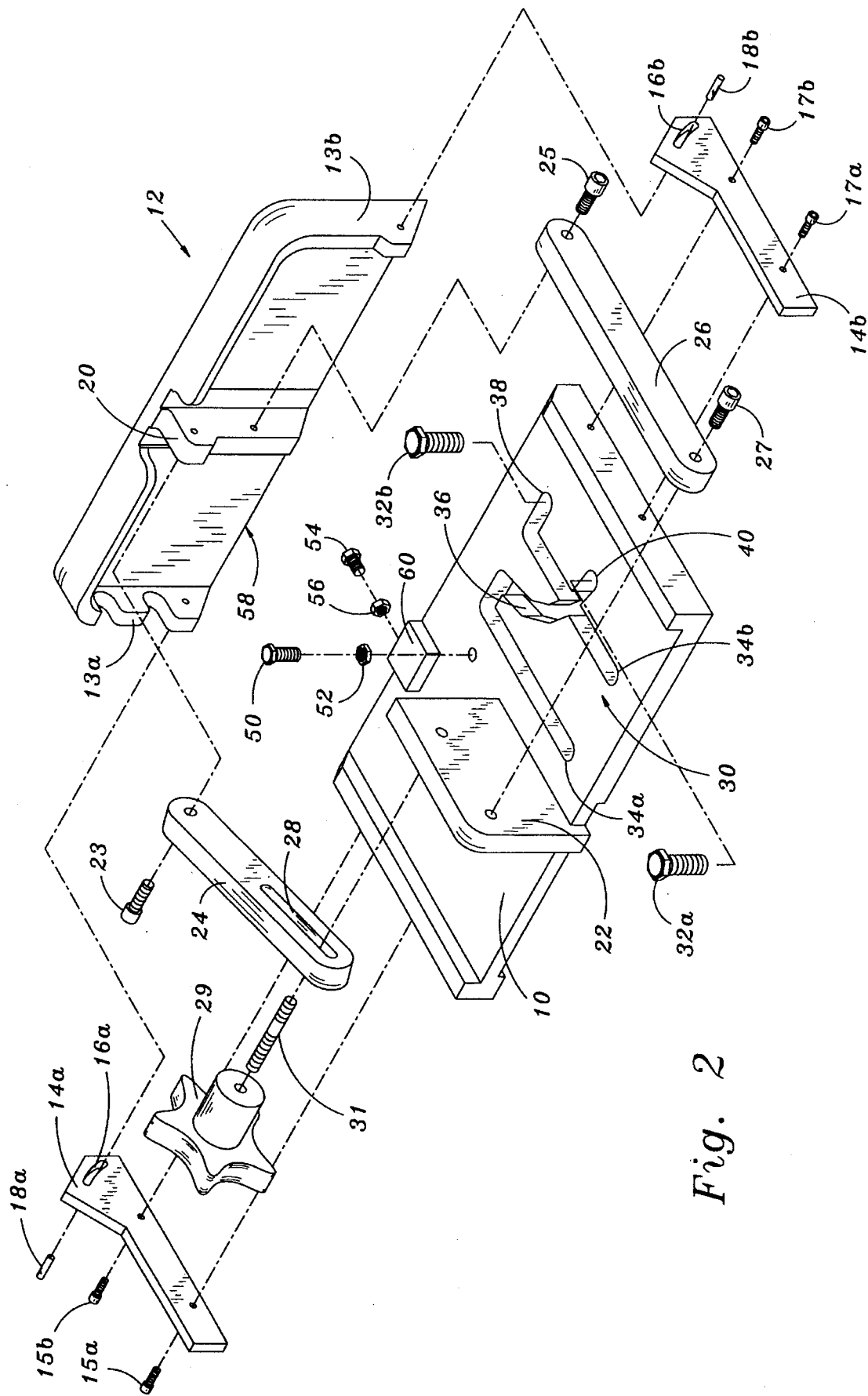
FIG. 2 is an exploded perspective view of the fence/table of the present invention.
Figure 3:
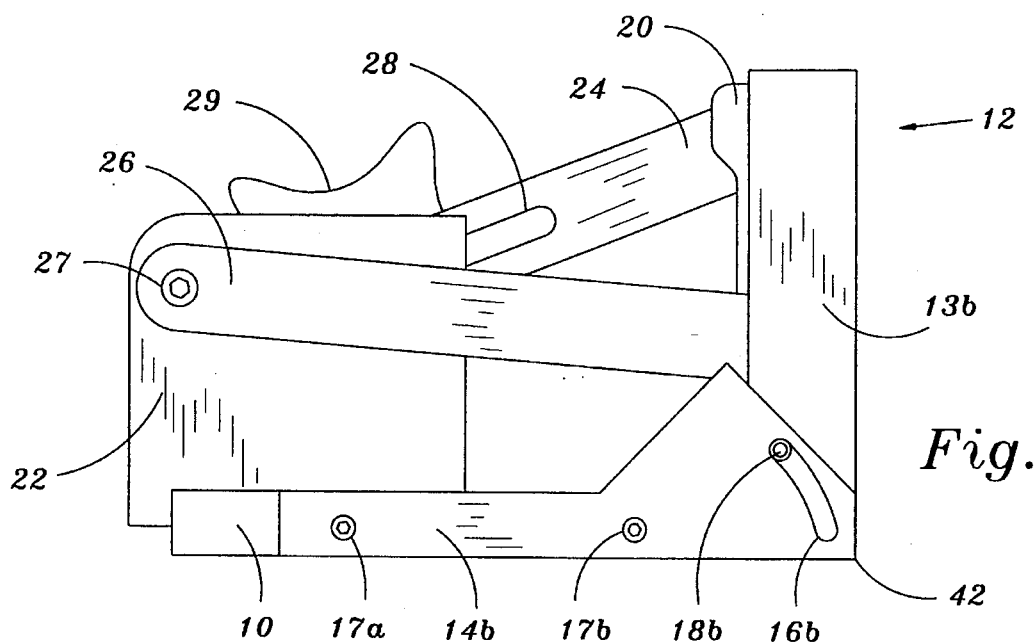
FIG. 3 is a side view of the fence/table of the present invention with the plate in a position substantially perpendicular to the base.
Figure 4:
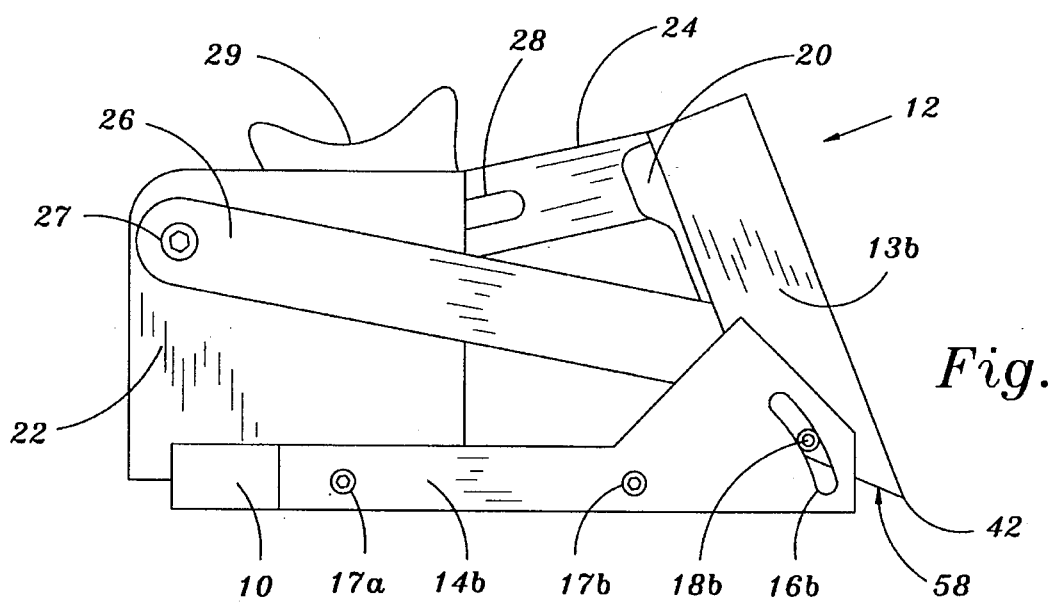
FIG. 4 is a side view of the fence/table of the present invention with the plate tilted at a different angle with respect to the base.
Figure 5:
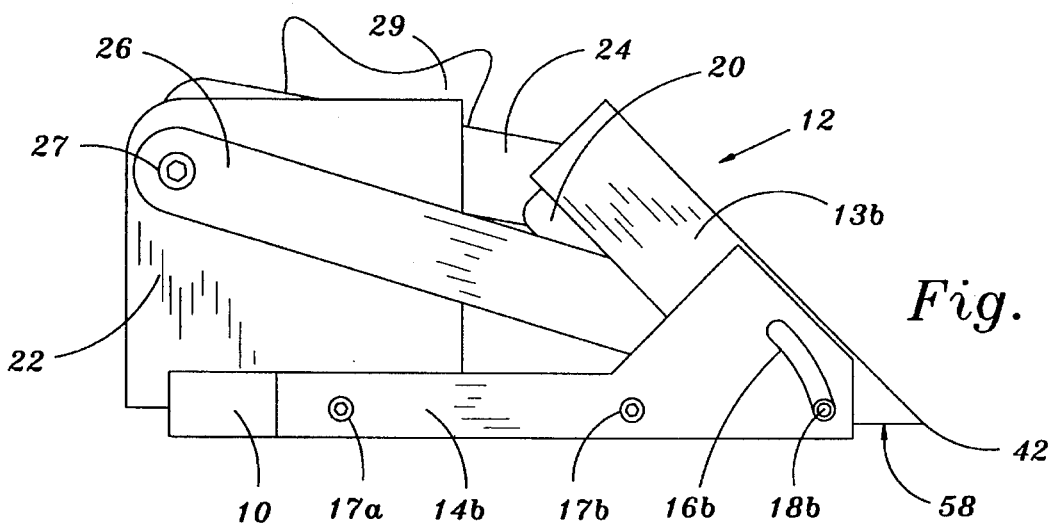
FIG. 5 is a side view of the fence/table of the present invention with the table tilted about 45° from the position depicted in FIG. 3.

Referring to FIGS. 1 and 2, the fence/table of the present invention comprises a base 10 and a plate 12. In one position, plate 12 is perpendicular to base 10. However, plate 12 is adapted to be tilted to different angles with respect to base 10. A pair of end control brackets 14a, b are fixedly attached to the outer edges of base 10 via two pairs of screws 15a, b and 17a, b. End control brackets 14a, b include tilting grooves 16a, b, respectively, through which a pair of pins 18a, b extend to be connected to sidewalls 13a, b of plate 12. Pins 18a, b are adapted for movement within tilting grooves 16a, b such that plate 12 is movable to a variety of angles with respect to base 10, as shown in FIGS. 3–5. In the preferred embodiment, plate 12 is movable up to 45° from its position perpendicular to base 10. It should be noted, however, that where an application requires it, the apparatus is designed such that plate 12 rotates farther with respect to base 10.

A hex screw 50 and nut 52 preferably are used to limit the angle to which plate 12 is tilted with respect to base 10. Plate 12 contacts hex screw 50 when plate 12 has been tilted 45° from its position perpendicular to base 10. Hex screw 50 is adjustable so as to ensure that it stops plate 12 at a 45° angle with respect to base 10. Hex screw 54 and nut 56 serve a similar purpose with respect to maintaining plate 12 at a 90° angle with respect to base 10. Hex screw 54 contacts an angled side 58 of plate 12 to prevent further movement of plate 12. Hex screw 54 is adjustable to ensure that plate 12 is positioned at a 90° angle with respect to base 10. Base 10 can include a raised portion 60 for accommodating hex screw 54 to ensure that hex screw 54 is positioned appropriately with respect to angled side 58.

Plate 12 has a flat face 11 (most clearly seen in FIG. 6) for supporting a workpiece when the fence/table is used as a table and for guiding a workpiece when the fence/table is used as a fence. Edge 42 of plate 12 is substantially linear and is spaced in close relation to the power tool. In the preferred embodiment, plate 12 has a flange 20 extending outwardly on the opposite side of plate 12 from face 11. In the preferred embodiment, a wall 22 extends outwardly from a flat portion of base 10 in a direction perpendicular to base 10.

A short link 24 and a long link 26 enable plate 12 to be tilted with respect to base 10. Short link 24 and long link 26 are each connected to base 10 and plate 12. In the preferred embodiment, short link 24 and long link 26 are connected to opposite sides of flange 20 and wall 22. Short link 24 is connected to flange 20 via a screw 23. Long link 26 is connected to flange 20 via a screw 25. The opposite end of long link 26 is connected to wall 22 via a screw 27. Short link 24 includes an adjustment channel 28. A knob 29, located on a threaded shaft 31, frictionally engages short link 24 against wall 22 to releasably lock plate 12 in position with respect to base 10.

The apparatus of the present invention also provides for repositioning from the fence position to the table position, and vice versa. Base 10 defines placement tracking 30. A pair of placement bolts 32a, b extend through placement tracking 30 into a pair of power tool holes (not shown) and orient plate 12 across the belt sander (as a table), parallel to the belt sander (as a fence) or at some intermediate angle. In the preferred embodiment, the power tool contains a second pair of power tool holes (not shown) so that the fence/table is placed near the bottom of the belt when used as a table with the belt sander in its vertical position and closer to the middle of the belt when used as a fence with the belt sander. A spacer plate (not shown) is placed around the power tool holes in between the fence/table and the frame of the power tool.

Placement tracking 30 includes a pair of straight tracks 34a, b, an arc track 36, a pivot opening 38 and a table opening 40, located at one end of arc track 36. Placement bolt 32b is located in pivot opening 38 except when plate 12 is positioned overlying the power tool, as described below. Placement bolt 32a is located in table opening 40 when face-11 is being used as a table. In order to rotate face 11 from its table position to its fence position, base 10 is rotated such that placement bolt 32a travels through the entire length of arc track 36 and is positioned at the opposite end of arc track 36, thereby reorienting face 11 with respect to the power tool.

Straight tracks 34a, b are used when the operator moves plate 12 from a fence position at the edge of the belt sander to a fence position where plate 12 overlies a portion of the length of the belt sander. Base 10 is moved such that placement bolt 32a is placed in straight track 34a and placement bolt 32b is placed in straight track 34b. This placement allows base 10 to slide with respect to the belt sander, thereby moving plate 12 to a position overlying a portion of the sander.

In operation, the present invention works as follows. Referring to FIG. 3, plate 12 is shown substantially perpendicular to base 10. As noted above, however, plate 12 is tiltable with respect to base 10. Knob 29 is loosened to eliminate its frictional engagement with short link 24 when an operator wants to tilt plate 12. Once knob 29 is loosened, short link 24 is free to move. This allows an operator to reorient plate 12 at a new angle with respect to base 10. FIG. 4 depicts one possible reorientation. Edge 42 of plate 12 remains substantially the same distance from the power tool as before plate 12 was tilted.

In the preferred embodiment, plate 12 is rotatable up to 45° from its position perpendicular to base 10. FIG. 5 depicts plate 12 in this position. Throughout this range of positions from the position of FIG. 3 to the position of FIG. 5, edge 42 of plate 12 remains substantially the same, relatively short distance from the belt sander.

Figure 6:
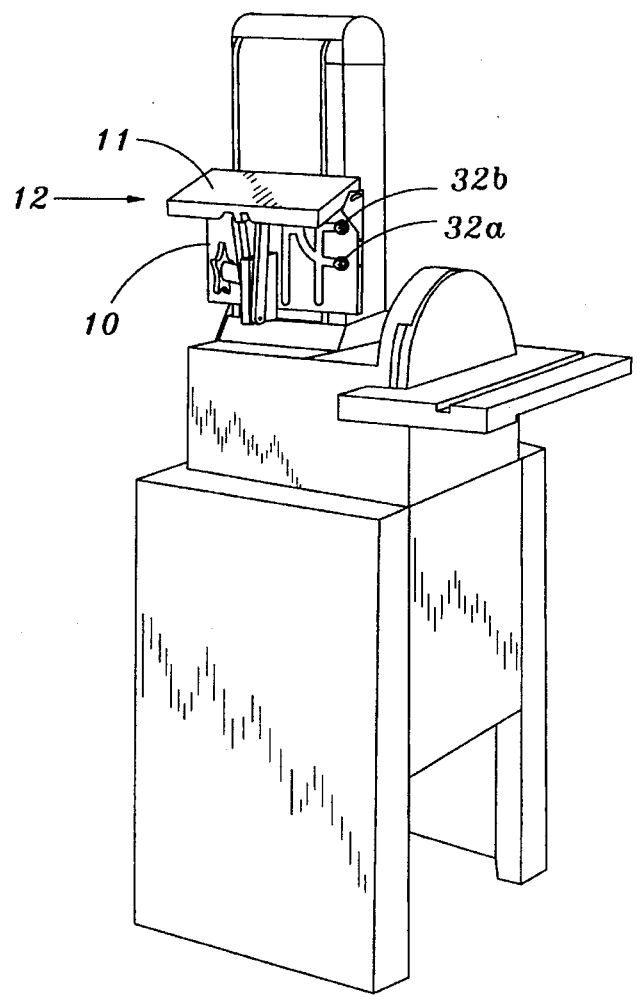
FIG. 6 is a perspective view of a belt sander in its vertical position having a fence/table of the present invention attached thereto in its table position.

As noted above, face 11 functions both as a fence and a table. Referring to FIG. 6, plate 12 is shown in its table position. When an operator wishes to use face 11 as a fence, placement bolts 32a, b are loosened. Base 10 is then rotated about pivot opening 38 such that placement bolt 32a travels through the length of arc track 36, thereby reorienting plate 12 90° from its previous position. Alternatively, plate 12 is placed in an intermediate position by leaving placement bolt 32a at an intermediate position within arc track 36. Placement bolts 32a, b are then tightened to maintain the desired position.

Figure 7:
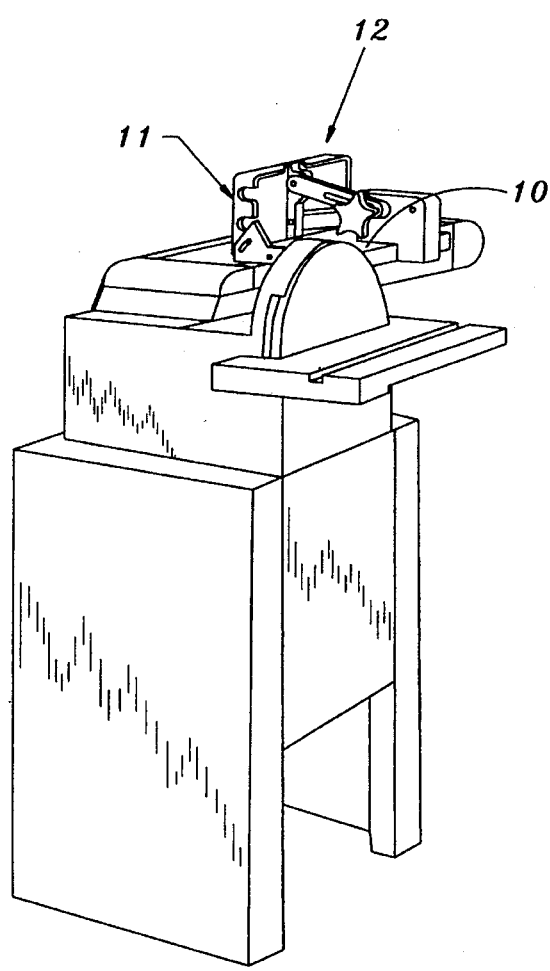
FIG. 7 is a perspective view of a belt sander in its horizontal position having a fence/table of the present invention attached thereto in its fence position.

Plate 12 is placed in a position overlying the power tool by first loosening placement bolts 32a, b. Then, base 10 is moved to locate placement bolts 32a, b into straight tracks 34a, b, respectively. Once in this position, an operator slides base 10 across the width of the belt sander to the desired location. Finally, placement bolts 32a, b are tightened to maintain plate 12 at this position as shown in FIG. 7.

It should be noted that although the fence/table of the present invention has been shown in conjunction with a belt sander, its use is not so limited. The apparatus also is useful with other types of power tools, including, but not limited to, a jointer.

Whereas the present invention has been described with respect to specific embodiments thereof, it will be understood that various changes and modifications will be suggested to one skilled in the art and it is intended that the invention encompass such changes and modifications as fall within the scope of the appended claims.

What is claimed is:

1. An apparatus for use as a fence and as a table with a power tool used for working on a workpiece, comprising:

a, base;

a plate adapted to be positioned substantially perpendicular to said base;

means for connecting said plate and said base;

means for joining said base to the power tool, including a first placement bolt and a second placement bolt; and means for moving said base from a first position with respect to the power tool to a second position with respect to the power tool, said second position of said base being in the same plane as said first position of said base and said second position being rotated about 90° from said first position;

wherein said base is movable linearly across the width of the power tool while maintaining said first placement bolt and said second placement bolt in constant positions with respect to the power tool.

2. The apparatus of claim 1 wherein said base defines at least one straight track for movement of said base across the width of the power tool.

3. An apparatus for use as a fence and as a table with a power tool used for working on a workpiece, comprising:

a, base;

a plate adapted to be positioned substantially perpendicular to said base;

means for connecting said plate and said base;

means for joining said base to the power tool, including a first placement bolt and a second placement bolt; and means for moving said base from a first position with respect to the power tool to a second position with respect to the power tool, said second position of said base being in the same plane as said first position of said base and said second position being rotated about 90° from said first position;

wherein said base defines a first straight track for receiving said first placement bolt and a second straight track for receiving said second placement bolt.

4. An apparatus for use as a fence and as a table with a power tool used for working on a workpiece, comprising:

a, base;

a plate adapted to be positioned substantially perpendicular to said base;

means for connecting said plate and said base;

means for joining said base to the power tool, including a first placement bolt and a second placement bolt; and means for moving said base from a first position with respect to the power tool to a second position with respect to the power tool, said second position of said base being in the same plane as said first position of said base and said second position being rotated about 90° from said first position;

wherein said plate is selectively tiltable with respect to said base;

wherein said plate has an edge closest to the power tool for supporting the workpiece and wherein said edge remains an essentially constant distance from the power tool when said plate is tilted with respect to said base; and wherein said base is movable linearly across the width of the power tool while maintaining said first placement bolt and said second placement bolt in constant positions with respect to the power tool.

5. An apparatus for use as a fence and as a table with a power tool used for working on a workpiece, comprising:

a, base;

a plate adapted to be positioned at a range of angles with respect to said base, including a position defining an angle of about 90° with said base;

means operatively connected to said base and to said plate for selectively tilting said plate with respect to said base;

a first placement bolt and a second placement bolt, said first and second placement bolts joining said base to the power tool; and means for moving said base linearly across the width of the power tool while maintaining said first placement bolt and said second placement bolt in constant positions with respect to the power tool;

wherein said plate includes an edge substantially parallel to the power tool for supporting the workpiece, said edge defining a distance between said edge and the power tool and wherein said distance is essentially constant throughout the range of angles at which said plate is positioned with respect to said base.

6. An apparatus for use as a fence and as a table with a power tool used for working on a workpiece, comprising:

a, base;

a plate adapted to be positioned at a range of angles with respect to said base, including a position defining an angle of about 90° with said base; and means operatively connected to said base and to said plate for selectively tilting said plate with respect to said base;

wherein said tilting means comprises:
  a short link having a channel therein, said short link being connected to said base and to said plate;
  a pin housed in said channel for limiting movement of said short link with respect to said plate; and
  a long link connected to said base and to said plate and adapted for movement with respect to said base and to said plate.

7. The apparatus of claim 6 wherein said tilting means further comprises means for selectively preventing movement of said short link.

8. The apparatus of claim 6 wherein said base comprises a flat portion and a wall substantially perpendicular to said flat portion and wherein said short link and said long link are connected to said wall and are selectively movable with respect to said wall.

9. The apparatus of claim 6 wherein said plate comprises a face and a flange opposite said face and wherein said short link and said long link are connected to said flange and are selectively movable with respect to said flange.

10. An apparatus for use as a fence and as a table with a power tool used for working on a workpiece, comprising:

a, base;

a plate adapted to be positioned at a range of angles with respect to said base, including a position defining an angle of about 90° with said base; and means operatively connected to said base and to said plate for selectively tilting said plate with respect to said base;

wherein said tilting means comprises:
  a short link having a channel therein, said short link being connected to said base and to said plate;
  a pin housed in said channel for limiting movement of said short link with respect to said plate;
  a long link connected to said base and to said plate and adapted for movement with respect to said base and to said plate; and
  a pair of end control brackets attached to said plate and said base, said end control brackets each having a tilting groove for limiting movement of said plate with respect to said base;

wherein said plate has an edge closest to the power tool for supporting the workpiece and wherein said edge remains an essentially constant distance from the power tool when said plate is tilted with respect to said base.

11. An apparatus for use as a fence and as a table with a power tool used for working on a workpiece, comprising:

a, base defining a pivot opening, an arc track, a first straight track and a second straight track, said base being movable linearly across the width of the power tool;

a plate adapted to be tilted at a range of angles with respect to said base, including a position defining an angle of about 90° with said base, said plate having an edge closest to the power tool for supporting the workpiece, said edge remaining an essentially constant distance from the power tool when said plate is tilted with respect to said base;

a wall extending from said base in a direction substantially perpendicular to said base;

a short link connected to said wall and to said plate and being adapted for movement with respect to said wall and to said plate;

a long link connected to said wall and to said plate and adapted for movement with respect to said wall and to said plate;

means for connecting said base and said plate; and means for joining said base to the power tool;

wherein said base is movable from a first position with respect to the power tool to a second position with respect to the power tool, said second position being in the same plane as said first position and said second position being about 90° from said first position.

* * * * *